United States Patent
Zhou et al.

(10) Patent No.: US 12,395,723 B2
(45) Date of Patent: Aug. 19, 2025

(54) FOCUSING METHOD WITH OPERATION REGION, ELECTRONIC DEVICE, AND MEDIUM

(71) Applicant: VIVO MOBILE COMMUNICATION CO., LTD., Guangdong (CN)

(72) Inventors: Xuan Zhou, Guangdong (CN); Yuanyuan Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 129 days.

(21) Appl. No.: 18/356,278

(22) Filed: Jul. 21, 2023

(65) Prior Publication Data

US 2023/0370713 A1   Nov. 16, 2023

Related U.S. Application Data

(63) Continuation of application No. PCT/CN2022/073227, filed on Jan. 21, 2022.

(30) Foreign Application Priority Data

Jan. 22, 2021  (CN) .......................... 202110087086.6

(51) Int. Cl.
*H04N 23/63* (2023.01)
*H04N 23/67* (2023.01)
*H04N 23/69* (2023.01)

(52) U.S. Cl.
CPC ......... *H04N 23/632* (2023.01); *H04N 23/675* (2023.01); *H04N 23/69* (2023.01)

(58) Field of Classification Search
CPC .... H04N 23/632; H04N 23/675; H04N 23/69; H04N 23/62; H04N 23/635;
(Continued)

(56) References Cited

U.S. PATENT DOCUMENTS

2016/0077658 A1\* 3/2016 Kim ................ G06F 3/0412
345/173
2018/0150211 A1   5/2018 Huang et al.
(Continued)

FOREIGN PATENT DOCUMENTS

CN   103995663 A   8/2014
CN   104301597 A   1/2015
(Continued)

OTHER PUBLICATIONS

First Office Action for Chinese Application No. 202110087086.6, dated Dec. 16, 2021, 6 Pages.
(Continued)

*Primary Examiner* — Gevell V Selby
(74) *Attorney, Agent, or Firm* — BROOKS KUSHMAN P.C.

(57) ABSTRACT

A focusing method and apparatus, an electronic device, and a medium, and pertains to the field of electronic devices are provided. The method includes: displaying a shooting preview interface, where the shooting preview interface includes a first key and a target image; receiving a first input for a first region in the first key; and focusing, in response to the first input, a second region that is associated with the first region and that is in the target image.

9 Claims, 6 Drawing Sheets

(58) Field of Classification Search
CPC .................. H04N 23/631; H04N 23/67; G06F 2203/04801; G06F 3/04817; G06F 3/04845; G06F 3/0485; G06F 3/04883; G06F 2203/04806; G06F 3/0488
See application file for complete search history.

(56) References Cited

U.S. PATENT DOCUMENTS

| | | | |
|---|---|---|---|
| 2019/0041726 A1* | 2/2019 | Nishimura | ............ H04N 23/62 |
| 2020/0177821 A1* | 6/2020 | Okamoto | ............ H04N 23/635 |
| 2020/0267309 A1 | 8/2020 | Feng et al. | |
| 2021/0306552 A1* | 9/2021 | Takeichi | ................ H04N 23/62 |

FOREIGN PATENT DOCUMENTS

| | | |
|---|---|---|
| CN | 104660913 A | 5/2015 |
| CN | 105208277 A | 12/2015 |
| CN | 106911897 A | 6/2017 |
| CN | 108184070 A | 6/2018 |
| CN | 111050073 A | 4/2020 |
| EP | 1017232 A1 | 7/2000 |

OTHER PUBLICATIONS

International Search Report and Written Opinion for Application No. PCT /CN2022/073227 , dated Apr. 20. 2022, 9 Pages.
Extended European Search Report for Application No. 22742253.2, dated Jun. 17, 2024, 10 Pages.

* cited by examiner

FOCUSING METHOD WITH OPERATION REGION, ELECTRONIC DEVICE, AND MEDIUM

CROSS-REFERENCE TO RELATED APPLICATIONS

This application is a continuation of International Application No. PCT/CN2022/073227 filed on Jan. 21, 2022, which claims priority to Chinese Patent Application No. 202110087086.6 filed, which are incorporated herein by reference in their entireties.

TECHNICAL FIELD

This application pertains to the field of electronic devices, and in particular, to a focusing method and apparatus, an electronic device, and a medium.

BACKGROUND

An electronic device is used to shoot is very common in daily life. Before a user taps a shooting key, a to-be-shot image needs to be focused first. Generally, during shooting of electronic device, focusing processing is performed through automatic focus or by taping a focusing region on a screen of the electronic device.

In a process of implementing this application, the inventor finds that the prior art has at least the following problem: When a user performs shooting by using an electronic device with one hand, it is difficult to touch a majority of a shooting preview region with a finger if a holding posture is not changed and a thumb can touch a shooting key. Therefore, in a scene in which shooting is performed by using the electronic device with one hand, it is inconvenient for the user to shoot because the finger of the user cannot reach a focusing region.

SUMMARY

Embodiments of this application aim to provide a focusing method and apparatus, an electronic device, and a medium.

According to a first aspect, an embodiment of this application provides a focusing method, including displaying a shooting preview interface, where the shooting preview interface includes a first key and a target image; receiving a first input for a first region in the first key; and focusing, in response to the first input, a second region that is associated with the first region and that is in the target image.

According to a second aspect, an embodiment of this application provides a focusing apparatus, applied to an electronic device including a touch screen and including: an interface display module, configured to display a shooting preview interface, where the shooting preview interface includes a first key and a target image; an input receiving module, configured to receive a first input for a first region in the first key; and a region focusing module, configured to focus, in response to the first input, a second region that is associated with the first region and that is in the target image.

According to a third aspect, an embodiment of this application provides an electronic device. The electronic device includes a processor, a memory, and a program or an instruction that is stored in the memory and that can run on the processor, where when the program or the instruction is executed by the processor, the steps of the focusing method in the first aspect are implemented.

According to a fourth aspect, an embodiment of this application provides a readable storage medium. The readable storage medium stores a program or an instruction, and when the program or the instruction is executed by a processor, the steps of the focusing method in the first aspect are implemented.

According to a fifth aspect, an embodiment of this application provides a chip. The chip includes a processor and a communications interface, the communications interface is coupled to the processor, and the processor is configured to run a program or an instruction to implement the focusing method in the first aspect.

DETAILED DESCRIPTION

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a focusing method provided in the embodiments of this application is described in detail by using specific embodiments and application scenes.

Embodiments of the present disclosure provide a focusing method and apparatus, an electronic device, and a medium. The focusing method may be applied to an electronic device side and performed by an electronic device. The electronic device in the embodiments of this application includes but is not limited to an intelligent terminal such as a mobile phone, a tablet computer, a computer, or a wearable device.

Figure 1:
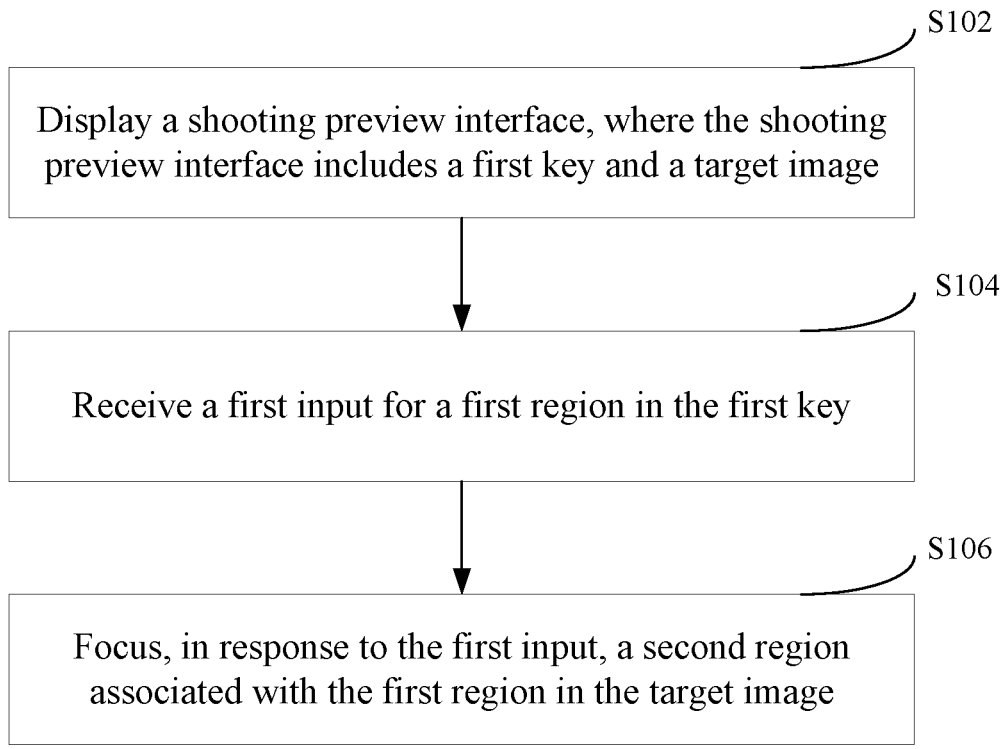
FIG. 1 is a schematic flowchart of a first focusing method according to an embodiment of this application.

FIG. 1 is a schematic flowchart of a focusing method according to an embodiment of this application. As shown in FIG. 1, the focusing method includes step S102, step S104, and step S106. The focusing method in the exemplary embodiment in FIG. 1 is described in detail below.

Step S102: Display a shooting preview interface, where the shooting preview interface includes a first key and a target image.

In a camera mode of an electronic device, a display unit of the electronic device displays the shooting preview interface, where the shooting preview interface includes the first key and the target image. The target image is an image in a viewfinder frame in the camera mode, the first key may be a key that may be operated by a user, and the first key may be a key for triggering shooting of an image.

In an embodiment, a processor of the electronic device can automatically find a focusing region when the electronic device just turns on the camera mode and is in an automatic focus mode by default, thereby adjusting a shooting effect. If the user has a specific focusing range requirement, the automatic focus mode may be switched to a manual focus mode in a preset manner on the shooting preview interface in the camera mode.

For example, when the electronic device is in the camera mode, a user input unit of the electronic device receives a third input performed by the user, and the processor of the electronic device switches a focus mode based on the third input. The focus mode includes an automatic focus mode and a manual focus mode. The third input may be a sliding input pointing to a preset direction, or may be a long-press input, a double-tap input, or the like.

Step S104: Receive a first input for a first region in the first key.

The user input unit of the electronic device obtains the first input for the first region in the first key.

The first input includes but is not limited to a sliding input, a tap input, a touch and hold input, and an icon selection input.

The first key includes at least one first region. The first region may be a preset fixed region or a free-moving region, or the first region may be a region at a position at which the first input terminates. For example, when the first input is a sliding input, the first region may be a region at a position at which the sliding input terminates.

In another embodiment, the first region may be a to-be-selected region for the user to select a focusing region from a plurality of preset regions in the target image. An arrangement manner of a plurality of to-be-selected regions is the same as that of the plurality of preset regions in the target image, that is, there is a position correspondence between each to-be-selected region and each preset region.

Step S106: Focus, in response to the first input, a second region that is associated with the first region and that is in the target image.

The processor of the electronic device focuses, in response to the first input, the second region that is associated with the first region and that is in the target image.

In some embodiments, the first region is a region at a position at which the first input terminates. For example, when the first input is a sliding input, the first region is a region at a position at which the sliding input terminates. In this embodiment, there is a predetermined association between the first region and the second region in the target image. For example, there is an association between position information of the first region in the first key and position information of the second region in the target image.

In some embodiments, the first region is used to indicate a moving direction, and before the receiving a first input for a first region in the first key in step S104, the focusing method may further include the following steps: obtaining focusing position information in the target image; and the focusing, in response to the first input, a second region that is associated with the first region and that is in the target image includes: in response to the first input, determining the second region based on the direction indicated by the first region, the focusing position information, and input duration of the first input in the first region, and focusing the second region.

The focusing position information is position information of an initial focusing region, and the initial focusing region may be a preset focusing region, or may be a focusing region determined based on a shooting habit of the user, or may be a focusing region determined during the last shooting of the electronic device. The first region may be a preset fixed region or a movable region.

The first region is used to indicate the moving direction. For example, the first region is a preset fixed region for indicating leftward movement, and when the user input unit of the electronic device receives the first input in the first region, the processor unit instructs a focusing region to move leftward. For another example, when the first region is a free-moving region and the first input is a sliding input that drags a touch point to move, the first region may be a region in which the touch point is located, and the first region is used to indicate that a focusing region moves toward a direction in which the touch point moves.

When the first region is used to indicate leftward movement, the direction indicated by the first region is leftward; and when the first region is used to indicate that the focusing region moves toward the direction in which the touch point moves, the direction indicated by the first region is the direction in which the touch point moves.

The first input may be a sliding input, a tap input, a touch and hold input, or a sliding input for a touch point.

For the input duration of the first input in the first region, for example, if the first input is a touch and hold input, and the first region is a fixed region for indicating leftward movement, the input duration of the first input in the first region is a time that the touch and hold input stays in the fixed region for indicating leftward movement.

For example, coordinates of the initial focusing region are (x1, x2). The 1st first region is used to indicate upward movement, and input duration of the first input in the 1st first region is y seconds; and the 2nd first region is used to indicate rightward movement, and input duration of the first input in the 2nd first region is z seconds. In this case, it is determined that coordinates of the second region are (x1+z, x2+y), and the second region is focused.

It should be noted that a track of the first input may pass through a region other than the first region in the first key. For example, when the first key includes a plurality of non-adjacent first regions, a finger corresponding to the first input does not leave the first key during movement from the 1st first region for indicating upward movement to the non-adjacent 2nd first region for indicating rightward movement. When the finger leaves the first key, the first input ends.

In another embodiment, if the first input is an icon selection input for the to-be-selected region corresponding to the plurality of preset regions in the target image, the processor of the electronic device determines, as the second region, a target preset region corresponding to a target icon selected through the icon selection input, and focuses the second region.

For example, the target image may be divided into n×m preset regions of the equal size based on a photo ratio set by the user, and the first key includes n×m independent to-be-selected regions, an arrangement manner of the to-be-selected regions is the same as that of the preset regions, and there is a one-to-one mapping relationship between the to-be-selected regions and the preset regions. The user taps a to-be-selected region as required, for example, the user taps a to-be-selected region whose coordinate information is (x1, x2), and it indicates that the second region selected by the user is a preset region in the $x1^{th}$ row and $x2^{th}$ column.

In some embodiments, after step S106 is performed, the focusing method may further perform the following steps: receiving a second input for the first key; and in response to the second input, adjusting a size parameter of the second region based on an input parameter of the second input, and focusing the adjusted second region.

The user input unit of the electronic device obtains the second input for the first key, and in response to the second input, the processor of the electronic device adjusts the size parameter of the second region based on the input parameter of the second input, and focuses the adjusted second region.

The second input includes but is not limited to a sliding input, a touch and hold input, a tap input, and a double-tap input.

In some embodiments, after the focusing a second region that is associated with the first region and that is in the target image in step S106 and before the receiving a second input for the first key, the focusing method further includes: displaying a second key, where the second key surrounds the first key, and the second input is a first sliding input for the second key; and the adjusting a size parameter of the second region based on an input parameter of the second input includes: determining a third region in the second key based on a track of the first sliding input, where the third region is a region through which the track of the first sliding input passes; and determining the size parameter of the second region based on a target ratio, where the target ratio is determined by an area of the third region and an area of a fourth region, and the fourth region is a region other than the third region in the first key or the second key.

The second key surrounds the first key. For example, the first key is a circular key, the second key is an annular key surrounding the circular key, or the first key is a rectangular key, and the second key is an annular key that surrounds the rectangular key and whose outer and inner edges are rectangular. An inner edge of the second key surrounding the first key and an outer edge of the first key may be the same shape or different shapes.

In some embodiments, the display unit of the electronic device highlights the third region in response to the first sliding input. Highlighting may be performed by changing a color of the third region to a preset color or by changing luminance of the third region. The third region is highlighted, so that the user of the electronic device can intuitively feel the track of the first sliding input, and the user can adjust a subsequent operation.

The fourth region may be the first key or the second key, or may be a region other than the third region in the second key.

In some embodiments, the fourth region is a region other than the third region in the second key, and the display unit of the electronic device cancels display of the first key. When the first input ends, display of the first key is canceled, and the second key is displayed.

For example, the first input is a sliding input, and when the first input ends, the sliding input is stopped, that is, the finger of the user is released from the first key, and the processor of the electronic device determines position information of the second key when the first input ends.

When the user input unit of the electronic device detects that the first input is stopped, the display unit of the electronic device cancels display of the first key and displays the second key. For example, the first key includes a plurality of first regions, the first key and the plurality of first regions included in the first key disappear when the finger of the user leaves the first key, and the second key in a hollow ring is displayed in the same position.

The determining the size parameter of the second region based on a target ratio may be understood as determining an amplification multiple of the second region based on the target ratio, and determining the size parameter of the second region based on the amplification multiple.

In some embodiments, the second input is a second sliding input, and the adjusting a size parameter of the second region based on an input parameter of the second input includes: adjusting the size parameter of the second region based on a ratio of an input track length of the second sliding input to a circumference of the first key.

In this embodiment, the first key may be circular, annular, rectangular, or other preset shapes. The circumference of the first key is a length of the outer edge of the first key. The amplification multiple of the second region is determined based on the ratio of the input track length to the circumference of the first key, and the size parameter of the second region is determined based on the amplification multiple.

Taking the first key in a hollow ring as an example, the circumference of the first key may be an outer circumference of the hollow ring, an inner circumference of the hollow ring, or may be an average circumference of the outer circumference and the inner circumference.

In another embodiment, the first key includes a luminance scale bar, and after step S106 is performed, the focusing method may further include the following steps: receiving a fourth input performed by the user on the luminance scale bar, and determining an input moving direction and an input moving distance of the fourth input in response to the fourth input; and increasing or decreasing luminance of the target image based on the input moving direction and the input moving distance.

The fourth input may be a sliding input for an adjustment flag of the luminance scale bar, a tap input or a double-tap input for a target scale point of the luminance scale bar, or another preset input for the luminance scale bar.

After step S106 is performed, the display unit of the electronic device updates the first key, and the updated first key includes the luminance scale bar. The user may adjust the luminance of the target image by dragging the adjustment flag of the luminance scale bar. When the finger of the user leaves a screen of the electronic device, it is considered that luminance adjustment is completed. If the luminance needs to be adjusted again, the adjustment flag may continue to be dragged. This application does not impose a special restriction on a timing of luminance adjustment.

If the user does not need to zoom in or zoom out the target image, the step of adjusting the size parameter of the second region may be skipped. Similarly, if the user does not need to adjust the luminance of the target image, the step of adjusting the luminance of the target image may be skipped.

After step S106 is performed, the first key includes a fifth region, and the processor of the electronic device may further perform the following procedure: receiving a fifth input for the fifth region in the first key; and performing shooting processing on the target image in response to the fifth input.

The fifth input may be a tap input submitted by the user in the fifth region, or may be another preset shooting confirmation input. The fifth region is a shooting confirmation region, and may be circular, or may be other preset shapes.

After the processor of the electronic device focuses the second region, the display unit of the electronic device updates the first key, and the updated first key includes the shooting confirmation region. The processor of the electronic device receives the fifth input and performs shooting processing on the target image in response to the fifth input.

In addition, the user may cancel the previous operation through a specific operation.

The user input unit of the electronic device receives a sixth input, and the processor of the electronic device cancels the previous operation in response to the sixth input. The sixth input is a sliding input whose moving direction is a preset direction, for example, a right-to-left sliding input.

In the embodiment shown in FIG. 1, first, a shooting preview interface is displayed, where the shooting preview interface includes a first key and a target image; then a first input for a first region in the first key is received; and a second region that is associated with the first region and that is in the target image is focused in response to the first input. According to the technical solution in this embodiment of this application, through the first input for the first region in the first key, focusing processing can be performed on the second region that is associated with the first region and that is in the target image, thereby reducing an area of an operation region required by a user during focusing. In this way, the user can more conveniently perform focusing when operating an electronic device by one hand, so that a problem that in a scene in which shooting is performed by using the electronic device with one hand, it is inconvenient for the user to shoot because the finger of the user cannot reach a focusing region is resolved.

Figure 2:
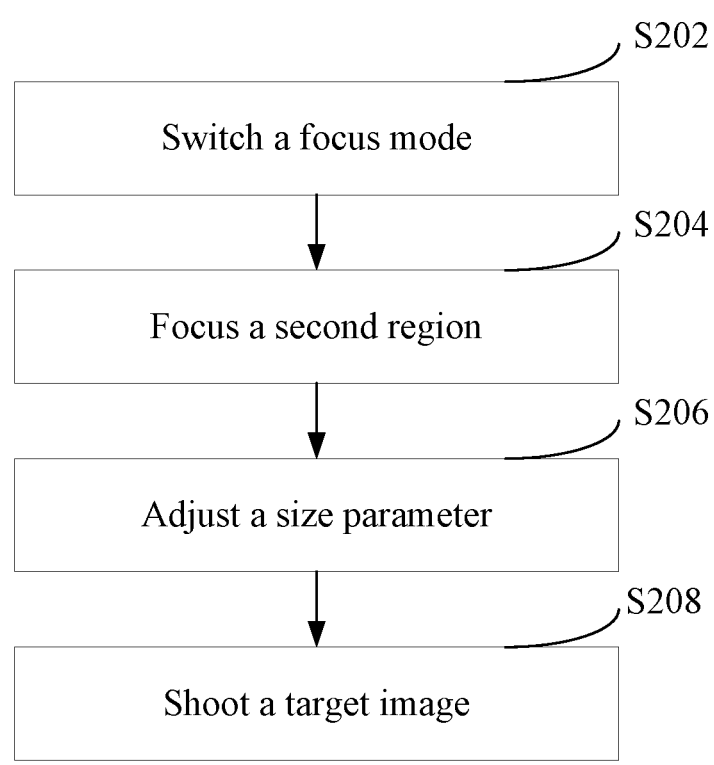
FIG. 2 is a schematic flowchart of a second focusing method according to an embodiment of this application.

FIG. 2 is a schematic flowchart of a second focusing method according to an embodiment of this application.

Step S202: Switch a focus mode.
Step S204: Focus a second region.
Step S206: Adjust a size parameter.
Step S208: Shoot a target image.

In step S202, a user input unit of an electronic device receives a third input performed by a user, and a processor of the electronic device switches from an automatic focus mode to a manual focus mode in response to the third input.

The third input may be a sliding input pointing to a preset direction, or may be a touch and hold input, a double-tap input, or the like.

In step S204, focusing position information in the target image, that is, position information of an initial focusing region, is obtained. The initial focusing region is, for example, a central region in the target image. The user input unit of the electronic device receives a first input performed by the user on a first region in a first key, and the processor of the electronic device focuses, in response to the first input, the second region that is associated with the first region and that is in the target image.

The first key includes the first region, and the first region may be a preset fixed region or a region at a position at which the first input terminates. For example, when the first input is a sliding input, the first region is a region at a position at which the sliding input terminates.

The first input includes but is not limited to a sliding input, a tap input, a touch and hold input, and an icon selection input.

The first key includes the first region, and the first region may be a preset fixed region or a free-moving region, or the first region may be a region at a position at which the first input terminates. For example, when the first input is a sliding input, the first region may be a region at a position at which the sliding input terminates.

Alternatively, the first region may be a to-be-selected region for the user to select a focusing region from a plurality of preset regions in the target image. An arrangement manner of a plurality of to-be-selected regions is the same as that of the plurality of preset regions in the target image, that is, there is a position correspondence between each to-be-selected region and each preset region.

In step S206, the user input unit of the electronic device receives a second input for the first key, and in response to the second input, the processor of the electronic device adjusts a size parameter of the second region based on an input parameter of the second input, and focuses the adjusted second region.

The second input includes but is not limited to a sliding input, a touch and hold input, a tap input, and a double-tap input.

In step S208, the user input unit of the electronic device receives a fifth input for a fifth region in the first key, and the processor of the electronic device performs shooting processing on the target image in response to the fifth input, where an obtained photo is a photo that is of the focused second region and that meets an expectation of the user.

The fifth input may be a tap input submitted by the user in the fifth region, or may be another preset shooting confirmation input. The fifth region is a shooting confirmation region, and may be circular, or may be other preset shapes.

The focusing method provided in this embodiment of this application can implement the processes implemented in the foregoing focusing method embodiment. To avoid repetition, details are not described herein again.

Figure 3:
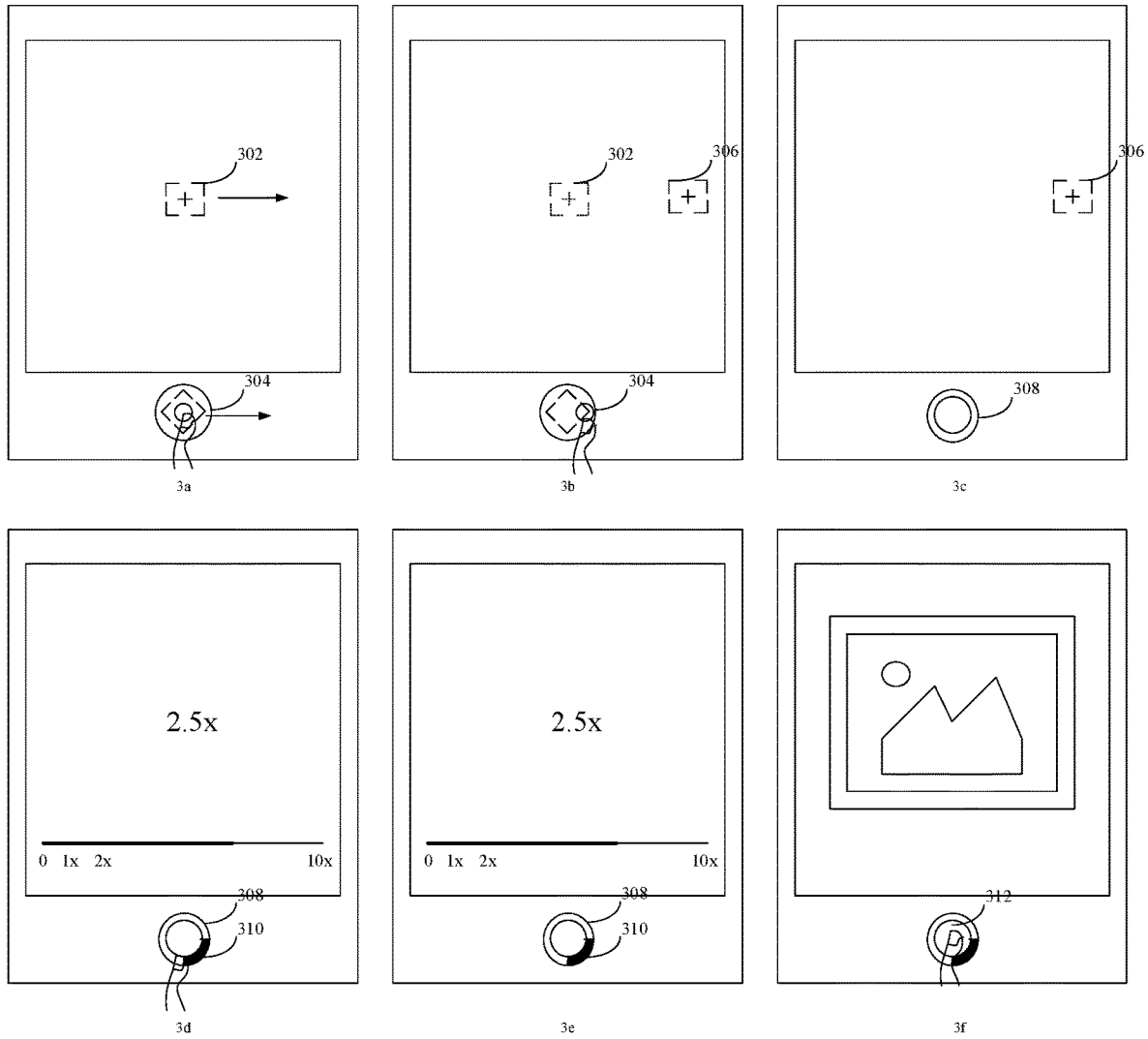
FIG. 3 is a schematic diagram of an application scene of a focusing method according to an embodiment of this application.

FIG. 3 is a schematic diagram of an application scene of a focusing method according to an embodiment of this application.

Referring to FIG. 3a, a shooting preview interface includes a first key and a target image, the first key includes a first region 304, and a focusing region identifier 302 is displayed in the target image, where the focusing region identifier 302 in FIG. 3a is located in a preset initial focusing region. A user input unit of an electronic device receives a first input in which a finger of a user slides rightward in the first region 304, and a processor of the electronic device controls the focusing region identifier 302 to move rightward.

Referring to FIG. 3b, the user input unit of the electronic device receives the first input in which the finger of the user slides rightward in the first region 304, and the processor of the electronic device controls the focusing region identifier 302 to move rightward to a specified region, and determines the specified region as a second region 306.

Referring to FIG. 3c, when the finger of the user leaves the first key, that is, when the user input unit of the electronic device detects that the first input ends, the processor of the electronic device focuses the second region 306, and a display unit of the electronic device cancels display of the first key and displays a second key 308. The second key 308 is a region in a hollow ring.

Referring to FIG. 3d, the user input unit of the electronic device receives a first sliding input performed by the user on the second key 308, and the display unit of the electronic device displays a region through which a track of the first sliding input passes in a specific color, to obtain a third region 310, where an amplification multiple corresponding to the third region 310 is 2.5.

Referring to FIG. 3e, the user releases the second key 308, that is, the user input unit of the electronic device determines the final third region 310 when detecting that the first sliding input ends, and the processor of the electronic device determines that the amplification multiple corresponding to the third region 310 is 2.5.

Referring to FIG. 3f, the user input unit of the electronic device receives a fifth input performed by the user on a fifth region 312, and the processor of the electronic device performs shooting processing in response to the fifth input to generate a photo that meets an expectation of the user.

The focusing method provided in this embodiment of this application can implement the processes implemented in the foregoing focusing method embodiment. To avoid repetition, details are not described herein again.

Figure 4:
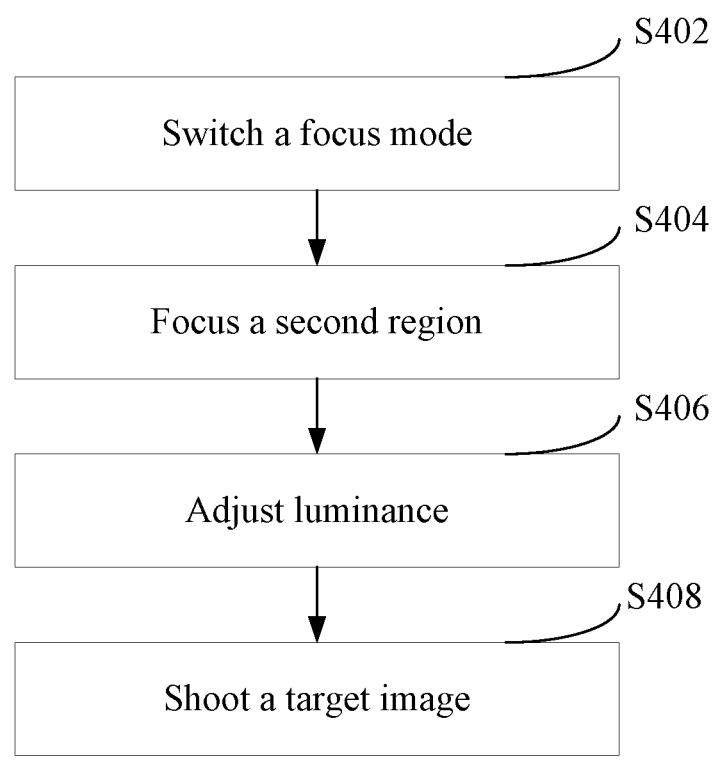
FIG. 4 is a schematic flowchart of a third focusing method according to an embodiment of this application.

FIG. 4 is a schematic flowchart of a third focusing method according to an embodiment of this application.

Step S402: Switch a focus mode.
Step S404: Focus a second region.
Step S406: Adjust luminance.
Step S408: Shoot a target image.

In step S402, a user input unit of an electronic device receives a third input performed by a user, and a processor of the electronic device switches from an automatic focus mode to a manual focus mode in response to the third input.

The third input may be a sliding input pointing to a preset direction, or may be a touch and hold input, a double-tap input, or the like.

In step S404, focusing position information in the target image, that is, position information of an initial focusing region, is obtained. The initial focusing region is, for example, a central region in the target image. The user input unit of the electronic device receives a first input performed by the user on a first region in a first key, and the processor of the electronic device focuses, in response to the first input, the second region that is associated with the first region and that is in the target image.

The first input includes but is not limited to a sliding input, a tap input, a touch and hold input, and an icon selection input.

The first key includes the first region, and the first region may be a preset fixed region or a free-moving region, or the first region may be a region at a position at which the first input terminates. For example, when the first input is a sliding input, the first region may be a region at a position at which the sliding input terminates.

Alternatively, the first region may be a to-be-selected region for the user to select a focusing region from a plurality of preset regions in the target image. An arrangement manner of a plurality of to-be-selected regions is the same as that of the plurality of preset regions in the target image, that is, there is a position correspondence between each to-be-selected region and each preset region.

In step S406, the user input unit of the electronic device receives a fourth input performed by the user on a luminance scale bar, and in response to the fourth input, the processor of the electronic device determines an input moving direction and an input moving distance of the fourth input, and increases or decreases luminance of the target image based on the input moving direction and the input moving distance.

The fourth input may be a sliding input for an adjustment flag of the luminance scale bar, a tap input or a double-tap input for a target scale point of the luminance scale bar, or another preset input for the luminance scale bar.

In step S408, the user input unit of the electronic device receives a fifth input for a fifth region in the first key, and the processor of the electronic device performs shooting processing on the target image in response to the fifth input, where an obtained photo is a photo that is of the focused second region and that meets an expectation of the user after luminance adjustment.

The fifth input may be a tap input submitted by the user in the fifth region, or may be another preset shooting confirmation input. The fifth region is a shooting confirmation region, and may be circular, or may be other preset shapes.

The focusing method provided in this embodiment of this application can implement the processes implemented in the foregoing focusing method embodiment. To avoid repetition, details are not described herein again.

Figure 5:
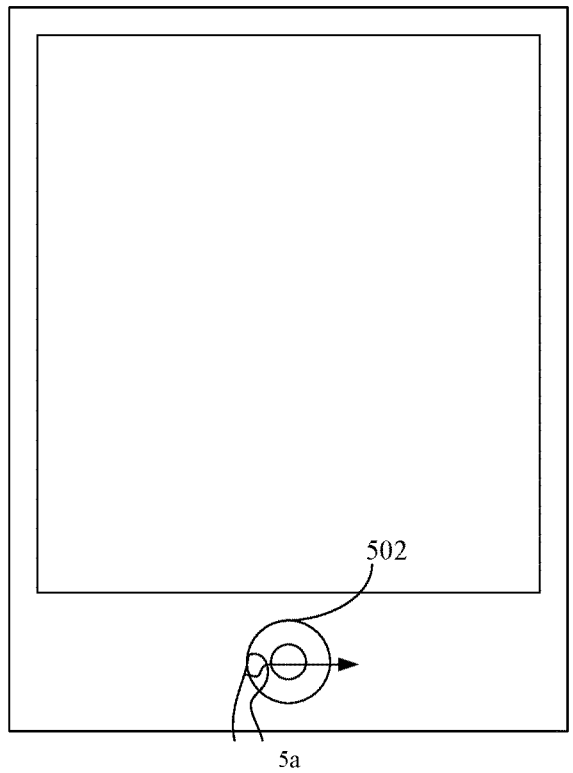
FIG. 5 is a schematic diagram of another application scene of a focusing method according to an embodiment of this application.
Figure 5:
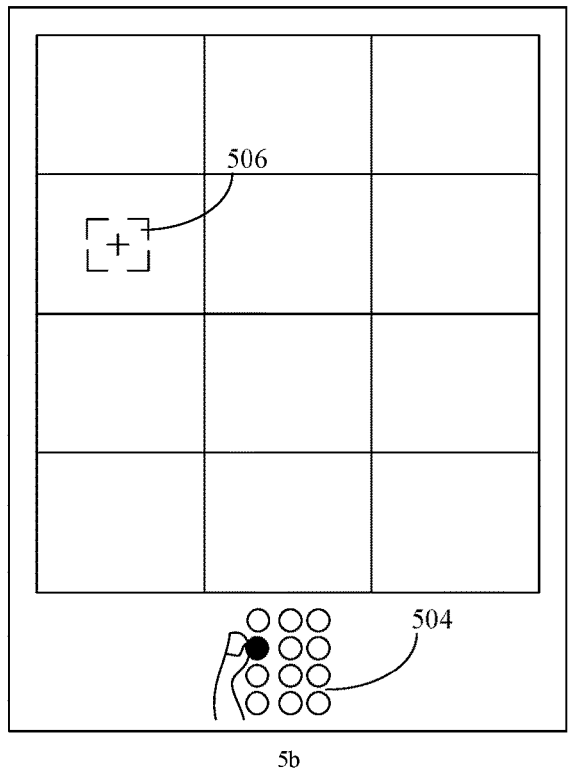
Figure 5:
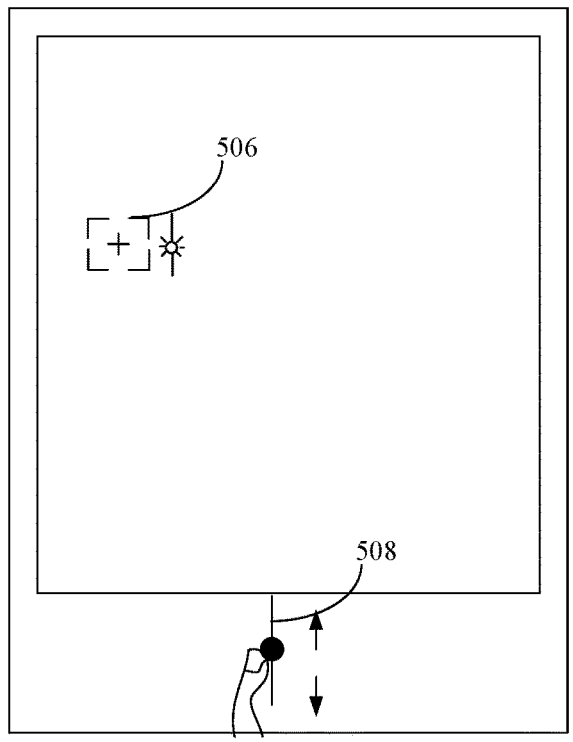
Figure 5:
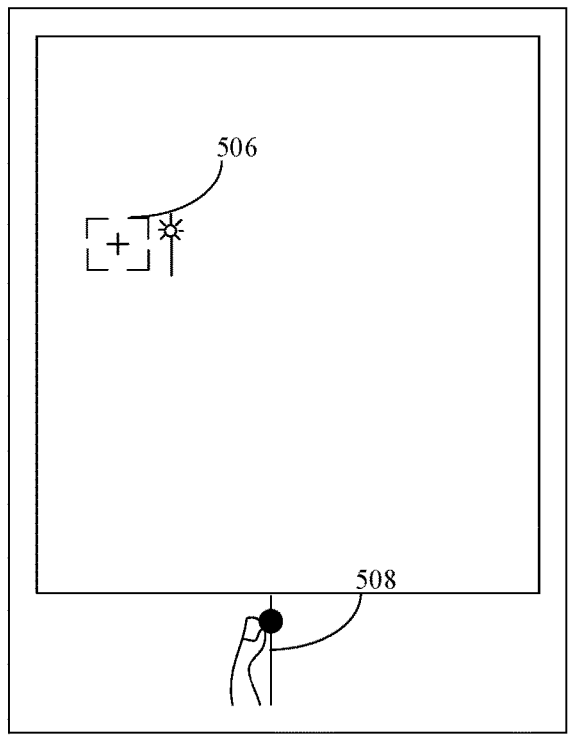

FIG. 5 is a schematic diagram of another application scene of a focusing method according to an embodiment of this application.

Referring to FIG. 5a, a user input unit of an electronic device receives a third input performed by a user on a first key 502, for example, a sliding input from left to right.

Referring to FIG. 5b, a display unit of the electronic device displays a plurality of preset regions in a target image; the user input unit of the electronic device receives an icon selection input on a first region 504 in the first key 502; and a processor of the electronic device focuses a second region 506 in response to the icon selection input.

Referring to FIG. 5c, when the icon selection input performed the user ends, the display unit of the electronic device updates display of the first key 502 and the target image; the user input unit of the electronic device receives a fourth input performed by the user on a luminance scale bar 508; and the processor of the electronic device controls an adjustment flag of the luminance scale bar 508 to move upward, and the display unit of the electronic device adjusts luminance of the target image.

Referring to FIG. 5d, the user input unit of the electronic device receives the fourth input performed by the user on the luminance scale bar 508; and the processor of the electronic device controls the adjustment flag of the luminance scale bar 508 to move upward to a designated position, and the display unit of the electronic device adjusts the luminance of the target image to designated luminance.

The focusing method provided in this embodiment of this application can implement the processes implemented in the foregoing focusing method embodiment. To avoid repetition, details are not described herein again.

Figure 6:
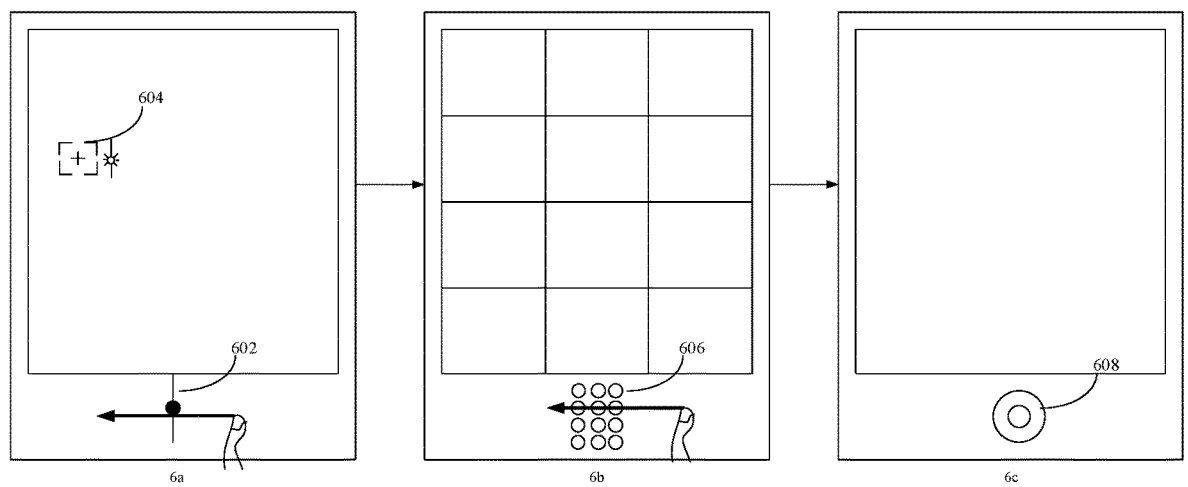
FIG. 6 is a schematic diagram of still another application scene of a focusing method according to an embodiment of this application.

FIG. 6 is a schematic diagram of still another application scene of a focusing method according to an embodiment of this application.

Referring to FIG. 6a, a focusing region identifier and a luminance scale bar identifier corresponding to a second region 604 are displayed in a target image on a shooting preview interface, and a first key on the shooting preview interface includes a luminance scale bar 602. A user input unit of an electronic device receives a sixth input, for example, a leftward sliding action performed by a user on the first key. A processor of the electronic device cancels the previous operation and returns to a shooting preview interface shown in FIG. 6b.

Referring to FIG. 6b, a target image on a shooting preview interface includes a plurality of preset regions. A first key on the shooting preview interface includes a first region 606, and the first region 606 includes a plurality of to-be-selected regions. The user input unit of an electronic device receives a sixth input again, for example, a leftward sliding action performed by the user on the first key. The processor of the electronic device cancels the previous operation and returns to a shooting preview interface shown in FIG. 6c.

Referring to FIG. 6c, the shooting preview interface includes a target image and a first key 608.

The focusing method provided in this embodiment of this application can implement the processes implemented in the foregoing focusing method embodiment. To avoid repetition, details are not described herein again.

Figure 7:
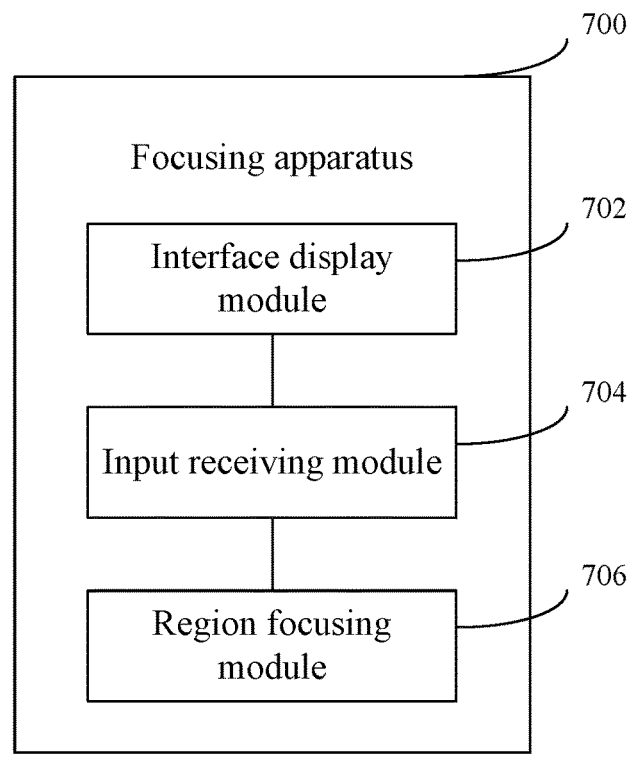
FIG. 7 is a schematic block diagram of a focusing apparatus according to an embodiment of this application.

FIG. 7 is a schematic block diagram of a focusing apparatus according to an embodiment of this application.

As shown in FIG. 7, a focusing apparatus 700 includes:
an interface display module 702, configured to display a shooting preview interface, where the shooting preview interface includes a first key and a target image;
an input receiving module 704, configured to receive a first input for a first region in the first key; and
a region focusing module 706, configured to focus, in response to the first input, a second region that is associated with the first region and that is in the target image.

In some embodiments, the focusing apparatus 700 further includes:
a second input receiving module, configured to receive a second input for the first key; and
a size adjustment module, configured to: in response to the second input, adjust a size parameter of the second region based on an input parameter of the second input, and focus the adjusted second region.

In some embodiments, the first region is used to indicate a moving direction, and the focusing apparatus 700 further includes:
a position obtaining module, configured to obtain focusing position information in the target image; and
the region focusing module is specifically configured to:
in response to the first input, determine the second region based on the direction indicated by the first region, the focusing position information, and input duration of the first input in the first region, and focus the second region.

In some embodiments, the focusing apparatus 700 further includes:
a second key display module, configured to display a second key, where the second key surrounds the first key, and
the second input is a first sliding input for the second key; and
the size adjustment module is specifically configured to:
determine a third region in the second key based on a track of the first sliding input, where the third region is a region through which the track of the first sliding input passes; and
determine the size parameter of the second region based on a target ratio, where the target ratio is determined by an area of the third region and an area of a fourth region, and the fourth region is a region other than the third region in the first key or the second key.

In some embodiments, the second input is a second sliding input, and the size adjustment module is specifically configured to:
adjust the size parameter of the second region based on a ratio of an input track length of the second sliding input to a circumference of the first key.

In this embodiment of this application, first, a shooting preview interface is displayed, where the shooting preview interface includes a first key and a target image; then a first input for a first region in the first key is received; and a second region that is associated with the first region and that is in the target image is focused in response to the first input. According to the technical solution in this embodiment of this application, through the first input for the first region in the first key, focusing processing can be performed on the second region that is associated with the first region and that is in the target image, thereby reducing an area of an operation region required by a user during focusing. In this way, the user can more conveniently perform focusing when operating an electronic device by one hand, so that a problem that in a scene in which shooting is performed by using the electronic device with one hand, it is inconvenient for the user to shoot because the finger of the user cannot reach a focusing region is resolved.

The focusing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a personal computer (PC), a television (TV), an automated teller machine, or a self-service machine. This is not specifically limited in the embodiments of this application.

The focusing apparatus in this embodiment of this application may be an apparatus with an operating system. The operating system may be an Android operating system, an iOS operating system, or another possible operating system. This is not specifically limited in this embodiment of this application.

The focusing apparatus provided in this embodiment of this application can implement the processes implemented in the focusing method embodiment in FIG. 1 to FIG. 6. To avoid repetition, details are not described herein again.

Figure 8:
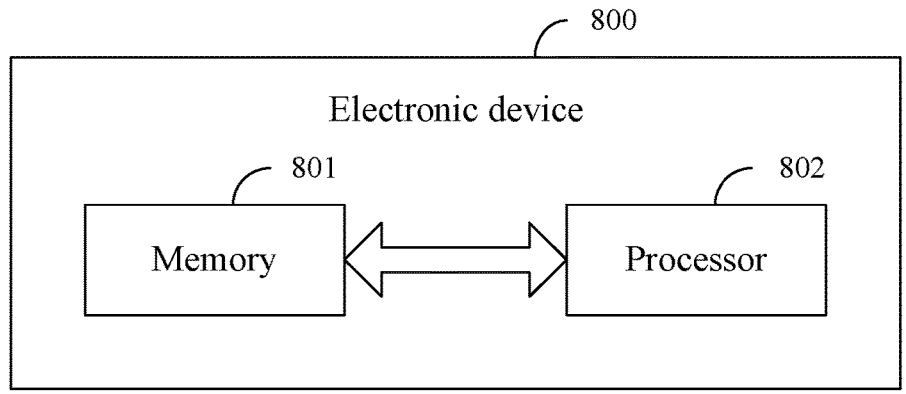
FIG. 8 is a schematic diagram of a hardware structure of an electronic device according to an embodiment of this application.

FIG. 8 is a schematic diagram of a hardware structure of an electronic device according to an embodiment of this application.

In some embodiments, as shown in FIG. 8, an embodiment of this application further provides an electronic device 800, including a processor 802, a memory 801, and a program or an instruction that is stored in the memory 801 and that can run on the processor 802. When the program or the instruction is executed by the processor 802, the processes of the foregoing focusing method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 9:
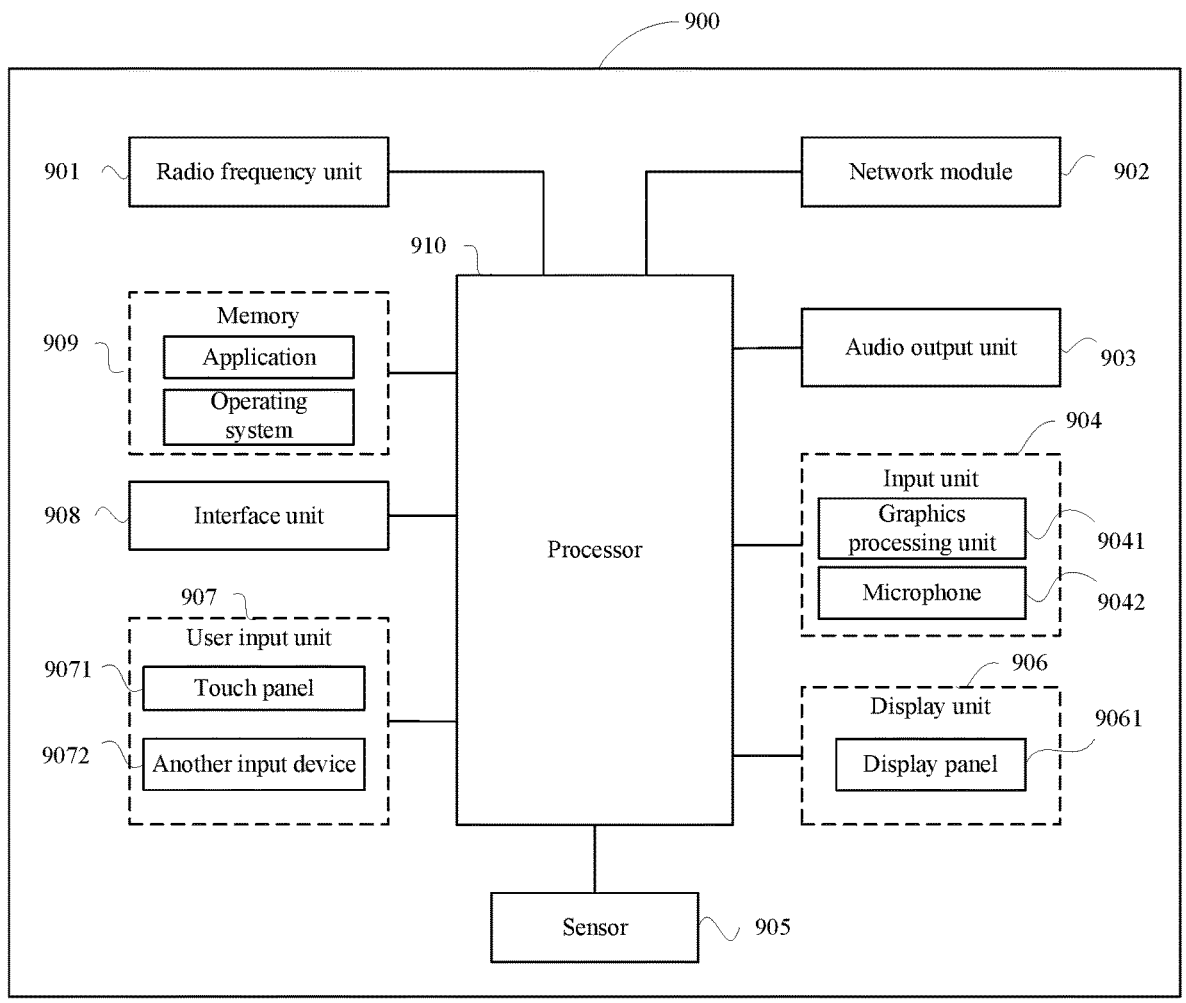
FIG. 9 is a schematic diagram of a hardware structure of another electronic device according to an embodiment of this application.

FIG. 9 is a schematic diagram of a hardware structure of another electronic device according to an embodiment of this application.

An electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the electronic device 900 may further include a power supply (such as a battery) that supplies power to each component. The power supply may be logically connected to the processor 910 by using a power supply management system, to implement functions such as charging and discharging management, and power consumption management by using the power supply management system. The structure of the electronic device shown in FIG. 9 does not constitute a limitation on the electronic device. The electronic device may include components more or fewer than those shown in the diagram, a combination of some components, or different component arrangements. Details are not described herein.

The display unit 906 is configured to display a shooting preview interface, where the shooting preview interface includes a first key and a target image;
  the user input unit 907 is configured to receive a first input for a first region in the first key; and
  the processor 910 is configured to focus, in response to the first input, a second region that is associated with the first region and that is in the target image.

In this embodiment of this application, first, a shooting preview interface is displayed, where the shooting preview interface includes a first key and a target image; then a first input for a first region in the first key is received; and a second region that is associated with the first region and that is in the target image is focused in response to the first input. According to the technical solution in this embodiment of this application, through the first input for the first region in the first key, focusing processing can be performed on the second region that is associated with the first region and that is in the target image, thereby reducing an area of an operation region required by a user during focusing. In this way, the user can more conveniently perform focusing when operating an electronic device by one hand, so that a problem that in a scene in which shooting is performed by using the electronic device with one hand, it is inconvenient for the user to shoot because the finger of the user cannot reach a focusing region is resolved.

In some embodiments, after the processor 910 focuses, in response to the first input, the second region that is associated with the first region and that is in the target image, the user input unit 907 is further configured to receive a second input for the first key; and
  the processor 910 is further configured to: in response to the second input, adjust a size parameter of the second region based on an input parameter of the second input, and focus the adjusted second region.

In some embodiments, the first region is used to indicate a moving direction, and the processor 910 is further configured to obtain focusing position information in the target image; and
  that the processor 910 is further configured to focus, in response to the first input, a second region that is associated with the first region and that is in the target image includes: in response to the first input, determining the second region based on the direction indicated by the first region, the focusing position information, and input duration of the first input in the first region, and focusing the second region.

In some embodiments, after the processor 910 focuses the second region that is associated with the first region and that is in the target image and before the user input unit 907 receives the second input for the first key, the display unit 906 is configured to display a second key, where the second key surrounds the first key, and
  the second input is a first sliding input for the second key; and the processor 910 is further configured to: determine a third region in the second key based on a track of the first sliding input, where the third region is a region through which the track of the first sliding input passes; and determine the size parameter of the second region based on a target ratio, where the target ratio is determined by an area of the third region and an area of a fourth region, and the fourth region is a region other than the third region in the first key or the second key.

In some embodiments, the second input is a second sliding input, and that the processor 910 is further configured to adjust a size parameter of the second region based on an input parameter of the second input includes: adjusting the size parameter of the second region based on a ratio of an input track length of the second sliding input to a circumference of the first key.

In this embodiment of this application, through the direction indicated by the first region, the focusing position information, the input duration of the first input in the first region, a focusing region can be moved to an expected position by a small operation area, and the size parameter of the second region is adjusted by the ratio that is of the area of the third region to the area of the fourth region and that is determined through the second input or the ratio that is of the input track length to the circumference of the first key and that is determined through the second input. In this way, a size of a focusing region can be adjusted by using only a single finger, thereby reducing an area of an operation region required by a user, and optimizing operation experience of the user.

It should be understood that, in this embodiment of this application, the input unit 904 may include a graphics processing unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. In some embodiments, the display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein. The memory 909 may be configured to store a software program and various data, including but not limited to an application and an operating system. An application processor and a modem processor may be integrated into the processor 910, the application processor mainly processes an operating system, a user interface, an application, and the like, and the modem processor mainly processes wireless communication. It can be understood that, alternatively, the modem processor may not be integrated into the processor 910.

An embodiment of this application further provides a readable storage medium. The readable storage medium stores a program or an instruction, and the program or the instruction is executed by a processor to implement the processes of the foregoing focusing method embodiment and a same technical effect can be achieved. To avoid repetition, details are not described herein again.

The processor is the processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing focusing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A focusing method, comprising:
displaying a shooting preview interface, wherein the shooting preview interface comprises a first key and a target image;
receiving a first input for a first region in the first key; and
focusing, in response to the first input, a second region that is associated with the first region and that is in the target image;
wherein after the focusing, in response to the first input, a second region that is associated with the first region and that is in the target image, the method further comprises:
receiving a second input for the second key; and
in response to the second input, adjusting a size parameter of the second region based on an input parameter of the second input, and focusing the adjusted second region;
wherein after the focusing a second region that is associated with the first region and that is in the target image and before the receiving a second input for the second key, the method further comprises:
displaying a second key, wherein the second key surrounds the first key, and
the second input is a first sliding input; and
the adjusting a size parameter of the second region based on an input parameter of the second input comprises:
determining a third region in the second key based on a track of the first sliding input, wherein the third region is a region through which the track of the first sliding input passes; and
determining the size parameter of the second region based on a target ratio, wherein the target ratio is determined by an area of the third region and an area of a fourth region, and the fourth region is a region other than the third region in the first key or the second key.

2. The method according to claim 1, wherein the first region is used to indicate a moving direction, and before the receiving a first input for a first region in the first key, the method comprises:
obtaining focusing position information in the target image; and
the focusing, in response to the first input, a second region that is associated with the first region and that is in the target image comprises:
in response to the first input, determining the second region based on the direction indicated by the first region, the focusing position information, and input duration of the first input in the first region, and focusing the second region.

3. The method according to claim 1, wherein the second input is a second sliding input, and the adjusting a size parameter of the second region based on an input parameter of the second input comprises:
adjusting the size parameter of the second region based on a ratio of an input track length of the second sliding input to a circumference of the first key.

4. An electronic device, comprising a processor, a memory, and a program or an instruction that is stored in the memory and that can run on the processor, wherein when the program or the instruction is executed by the processor, implements:
displaying a shooting preview interface, wherein the shooting preview interface comprises a first key and a target image;
receiving a first input for a first region in the first key; and
focusing, in response to the first input, a second region that is associated with the first region and that is in the target image;

wherein after the focusing, in response to the first input, a second region that is associated with the first region and that is in the target image, wherein when the program or the instruction is executed by the processor, further implements:
receiving a second input for the second key; and
in response to the second input, adjusting a size parameter of the second region based on an input parameter of the second input, and focusing the adjusted second region;
wherein after the focusing a second region that is associated with the first region and that is in the target image and before the receiving a second input for the second key, wherein when the program or the instruction is executed by the processor, further implements:
displaying a second key, wherein the second key surrounds the first key, and
the second input is a first sliding input; and
the adjusting a size parameter of the second region based on an input parameter of the second input comprises:
determining a third region in the second key based on a track of the first sliding input, wherein the third region is a region through which the track of the first sliding input passes; and
determining the size parameter of the second region based on a target ratio, wherein the target ratio is determined by an area of the third region and an area of a fourth region, and the fourth region is a region other than the third region in the first key or the second key.

5. The electronic device according to claim 4, wherein the first region is used to indicate a moving direction, and before the receiving a first input for a first region in the first key, wherein when the program or the instruction is executed by the processor, further implements:
obtaining focusing position information in the target image; and
the focusing, in response to the first input, a second region that is associated with the first region and that is in the target image comprises:
in response to the first input, determining the second region based on the direction indicated by the first region, the focusing position information, and input duration of the first input in the first region, and focusing the second region.

6. The electronic device according to claim 4, wherein the second input is a second sliding input, and the adjusting a size parameter of the second region based on an input parameter of the second input comprises:
adjusting the size parameter of the second region based on a ratio of an input track length of the second sliding input to a circumference of the first key.

7. A non-transitory readable storage medium, wherein the readable storage medium stores a program or an instruction, and when the program or the instruction is executed by a processor, implements:
displaying a shooting preview interface, wherein the shooting preview interface comprises a first key and a target image;

receiving a first input for a first region in the first key; and
focusing, in response to the first input, a second region that is associated with the first region and that is in the target image;
wherein after the focusing, in response to the first input, a second region that is associated with the first region and that is in the target image, wherein when the program or the instruction is executed by the processor, further implements:
receiving a second input for the second key; and
in response to the second input, adjusting a size parameter of the second region based on an input parameter of the second input, and focusing the adjusted second region;
wherein after the focusing a second region that is associated with the first region and that is in the target image and before the receiving a second input for the second key, wherein when the program or the instruction is executed by the processor, further implements:
displaying a second key, wherein the second key surrounds the first key, and
the second input is a first sliding input; and
the adjusting a size parameter of the second region based on an input parameter of the second input comprises:
determining a third region in the second key based on a track of the first sliding input, wherein the third region is a region through which the track of the first sliding input passes; and
determining the size parameter of the second region based on a target ratio, wherein the target ratio is determined by an area of the third region and an area of a fourth region, and the fourth region is a region other than the third region in the first key or the second key.

8. The non-transitory readable storage medium according to claim 7, wherein the first region is used to indicate a moving direction, and before the receiving a first input for a first region in the first key, wherein when the program or the instruction is executed by the processor, further implements:
obtaining focusing position information in the target image; and
the focusing, in response to the first input, a second region that is associated with the first region and that is in the target image comprises:
in response to the first input, determining the second region based on the direction indicated by the first region, the focusing position information, and input duration of the first input in the first region, and focusing the second region.

9. The non-transitory readable storage medium according to claim 7, wherein the second input is a second sliding input, and the adjusting a size parameter of the second region based on an input parameter of the second input comprises:
adjusting the size parameter of the second region based on a ratio of an input track length of the second sliding input to a circumference of the first key.

* * * * *